US012761679B2

(12) United States Patent
Jiang et al.

(10) Patent No.: US 12,761,679 B2
(45) Date of Patent: Oct. 13, 2026

(54) FEED FORWARD SUPPLY NOISE CANCELLATION (FFNC) TECHNIQUE WITH LOAD CURRENT SENSOR FOR REGULATOR PSR IMPROVEMENT

(71) Applicant: NVIDIA Corp., Santa Clara, CA (US)

(72) Inventors: Xi Jiang, Palo Alto, CA (US); Vipul Katyal, San Jose, CA (US); Virendra Kumar, Mountain View, CA (US)

(73) Assignee: Nvidia Corp., Santa Clara, CA (US)

( * ) Notice: Subject to any disclaimer, the term of this patent is extended or adjusted under 35 U.S.C. 154(b) by 172 days.

(21) Appl. No.: 18/643,958

(22) Filed: Apr. 23, 2024

(65) Prior Publication Data

US 2025/0330082 A1 Oct. 23, 2025

(51) Int. Cl.
*G05F 1/575* (2006.01)
*G05F 1/46* (2006.01)
*G05F 1/565* (2006.01)

(52) U.S. Cl.
CPC .............. *G05F 1/575* (2013.01); *G05F 1/467* (2013.01); *G05F 1/565* (2013.01)

(58) Field of Classification Search
CPC .......... G05F 1/575; G05F 1/467; G05F 1/565; G05F 1/46
See application file for complete search history.

(56) References Cited

U.S. PATENT DOCUMENTS

| | | | | |
|---|---|---|---|---|
| 2014/0176098 A1* | 6/2014 | Fang | G05F 1/46 | 323/280 |
| 2014/0340058 A1* | 11/2014 | Wang | H02M 1/15 | 323/268 |
| 2020/0159267 A1* | 5/2020 | Nedovic | G05F 1/575 | |
| 2021/0311513 A1* | 10/2021 | Joshi | G05F 1/575 | |
| 2023/0393601 A1* | 12/2023 | Roh | G05F 1/565 | |
| 2024/0264619 A1* | 8/2024 | Banerjee | G05F 1/575 | |

OTHER PUBLICATIONS

B. Yang, B. Drost, S. Rao and P. K. Hanumolu, "A high-PSR LDO using a feedforward supply-noise cancellation technique," 2011 IEEE Custom Integrated Circuits Conference (CICC), San Jose, CA, USA, 2011, pp. 1-4, doi: 10.1109/CICC.2011.6055409.

* cited by examiner

*Primary Examiner* — Ryan Johnson
(74) *Attorney, Agent, or Firm* — Carnelian Law, LLC

(57) ABSTRACT

A regulator for a load voltage includes a pass transistor for a load current, a gate voltage sensor coupled to a gate of the pass transistor, and a feed-forward supply noise cancellation circuit configured to amplify a gain of a supply noise cancelling signal at increments of the gate voltage.

19 Claims, 4 Drawing Sheets

FEED FORWARD SUPPLY NOISE CANCELLATION (FFNC) TECHNIQUE WITH LOAD CURRENT SENSOR FOR REGULATOR PSR IMPROVEMENT

BACKGROUND

Voltage regulators are commonly deployed to establish a stable and consistent power supply voltage to noise-sensitive circuitry, such as high-speed communication links. An important metric of voltage regulator performance is power supply noise rejection. Supply noise may originate for example from voltage ripple from a preceding switching regulator or coupling noise from digital circuits through the supply rail.

Conventional feed-forward mechanisms to improve power supply noise rejection involve feeding noise cancellation signals forward to either a gate or the body of a pass transistor. However, the absence of dynamic adjustment to the feed-forward gain may lead to potential over- or under-compensation of the power supply noise rejection under different load conditions.

Conventional mechanisms to adjust the feed-forward gain may not provide the needed accuracy or performance for some applications. Conventional mechanisms may also lack the ability to adequately adapt to process-temperature-voltage variations, or larger or more sudden changes in loading.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are embodiments of voltage regulators utilizing a load current sensor to control a feed-forward supply noise cancellation (FFNC) gain. Feed-forward supply noise cancellation selectively passes high-frequency supply noise while simultaneously amplifying and injecting the high-frequency supply noise into the gate of a pass transistor, thereby improving power supply noise rejection performance. A gain of the feed-forward supply noise cancellation may be regulated by a load voltage/current sensor, thereby enabling consistent and high-performance power supply noise rejection across a wide range of load conditions and process-voltage-temperature (PVT) variations.

Embodiments of the disclosed mechanisms include a pass transistor for the load current and a feed-forward supply noise cancellation circuit configured to generate gain increments to a noise-cancelling signal at the gate of the pass transistor in response to changes in the load current (more directly, in response to changes in a gate voltage of the pass transistor). A load sensor coupled to a gate of the pass transistor may be configured to generate the gain increments at particular levels of the load voltage/current, by adding or subtracting bias current from a noise filter (e.g., a low-pass filter) coupled to the gate.

Figure 1:
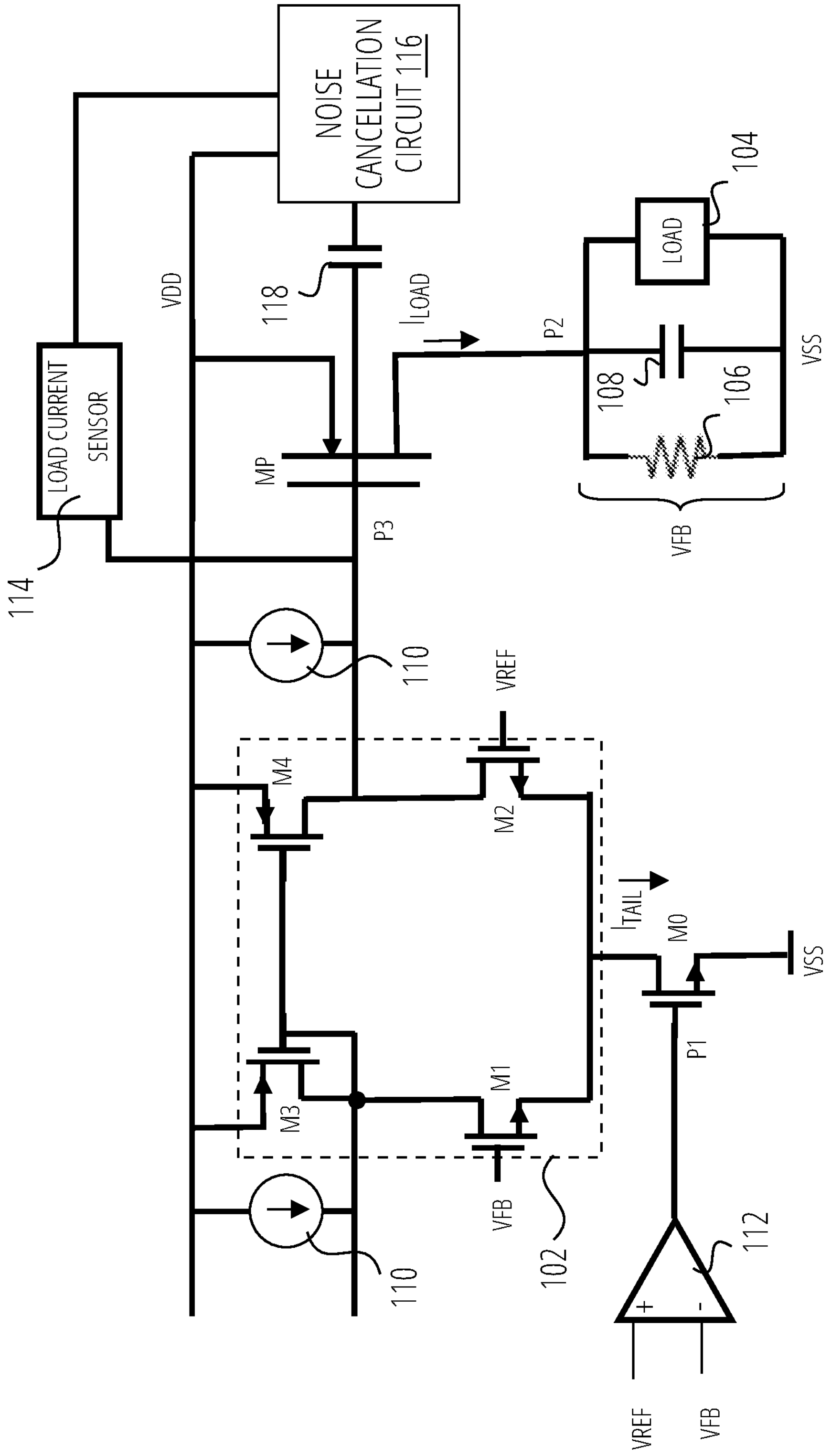
FIG. 1 depicts an embodiment of a load voltage regulator comprising an adaptive-gain noise cancellation circuit.

FIG. 1 depicts an embodiment of a load voltage regulator comprising an adaptive-gain noise cancellation circuit. A voltage follower 102 of reference load voltage VREF is implemented by transistors M1-M4 with feedback from the output voltage VFB across the load 104 (including resistive and capacitive elements 106, 108). A stable baseline amount of drive current is provided to the voltage follower 102 from the power supply rail VDD via fixed current sources 110, to provide a baseline amount of tail current $I_{tail}$ for active regulation during low loading conditions. To enhance the open-loop DC gain, an amplifier 112 is coupled to the gate of the current source transistor (M0) to drive the tail current $I_{tail}$ of the voltage follower 102.

The regulator comprises two feedback regulation loops each responsive to changes in the load voltage VFB: a slower-responding loop through amplifier 112, and a faster-responding loop through the voltage follower 102.

The load current sensor 114 monitors the load current $I_{load}$ through pass transistor MP. The current flowing through transistors M3 and M4 is proportional to the load current $I_{load}$, expressed as $I_{M3/4}=I_{LOAD}/k$, where k represents the size ratio of transistor MP to M3 and M4.

In response to an upward change in the load current $I_{load}$, the gate voltage VMP of the pass transistor (MP) will begin to decrease. If $I_{load}$ exhibits a downward change, the gate voltage VMP of the pass transistor (MP) will begin to increase.

Figure 2:
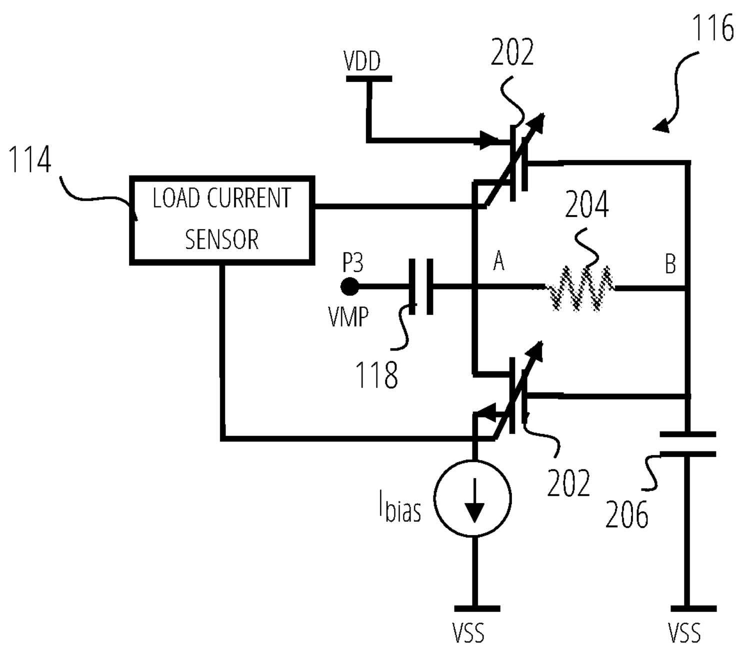
FIG. 2 is a high-level depiction of a noise cancellation circuit in one embodiment.
Figure 3:
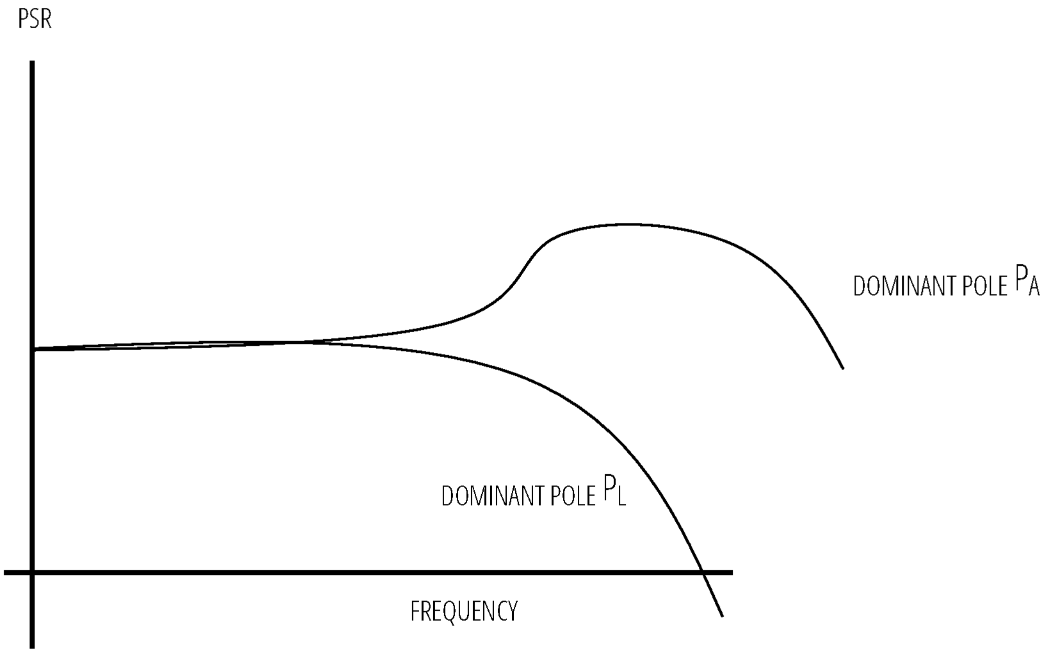
FIG. 3 depicts frequency response for different categories of noise cancellation mechanisms.

The load current sensor 114 controls a noise cancellation circuit 116, one embodiment of which is depicted in FIG. 2. Generally, a regulator system features two poles, $p_A$ and $p_L$, positioned at the regulator's error amplifier output node P3 and the regulator's output node P2, respectively. Regulators can be categorized into two groups depending on which pole serves as the dominant one, as depicted in FIG. 3. In cases where the dominant pole is situated at $p_L$, the presence of a large capacitive element 108 at the output effectively filters out noise from the supply at high frequencies beyond the unity gain bandwidth (UGB), resulting in a high power supply noise rejection. However, when the dominant pole is positioned at $p_A$, the power supply noise rejection gradually degrades as the frequency exceeds $p_A$, until the noise is suppressed by the capacitive element 108. Consequently, a hump-shaped region, having the worst power supply noise rejection, is expected to appear around UGB.

The first category of regulators typically utilizes a capacitive element 108 of sufficiently large value that it may necessitate implementation with an external capacitor. The voltage regulator mechanisms of the second category disclosed herein establish $p_A$ as the dominant pole and compensate for the power supply noise hump with feed-forward supply noise cancellation, so that a smaller capacitive element 108 may be utilized than in the first category of regulators.

The optimal feed-forward supply noise cancellation gain is directly proportional to the square root of load current $I_{load}$. The load current sensor 114 operates to adjust the feed-forward supply noise cancellation gain according to different load conditions.

Figure 5:
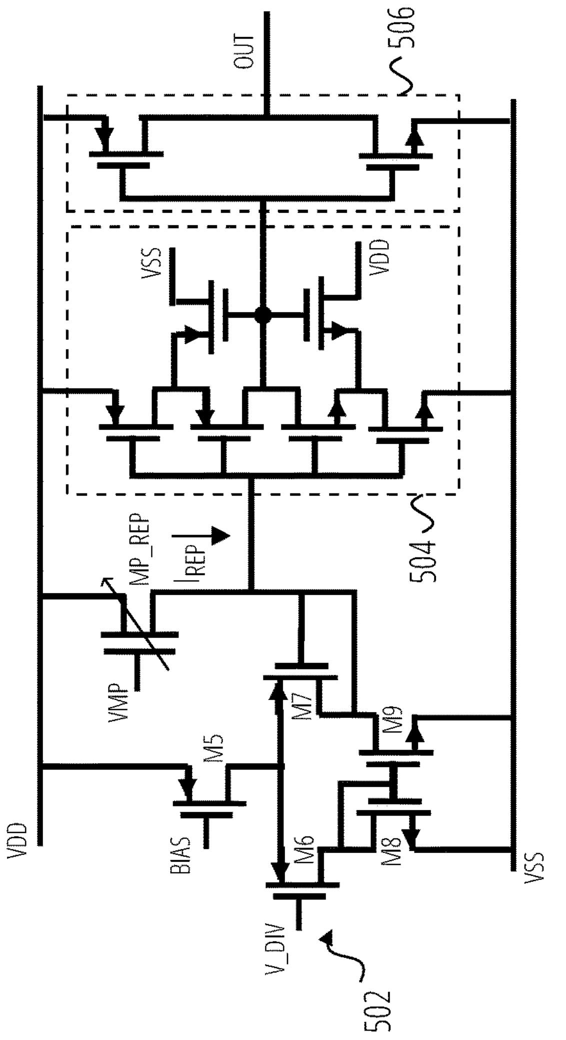
FIG. 5 depicts a comparator in one embodiment.
Figure 4:
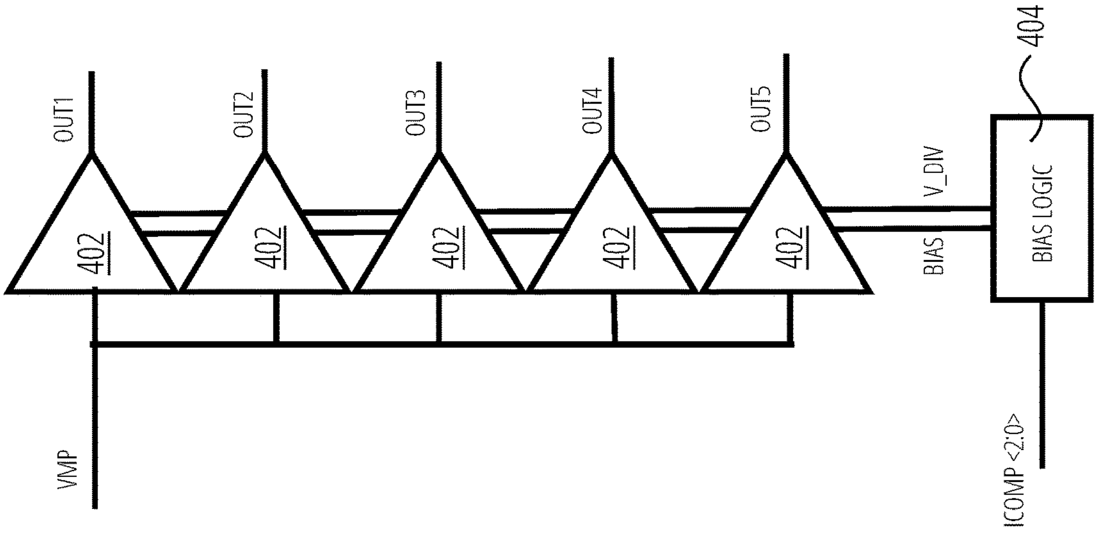
FIG. 4 depicts a load current sensor in one embodiment.

FIG. 4 depicts a load current sensor in one embodiment. Details of an embodiment of the comparator 402 are depicted in FIG. 5. The comparators 402 utilized in the sensor respond to the gate voltage VMP of pass transistor MP in the regulator, but internally provide a comparison of the current passing through MP ($I_{load}$) and a bias current that configures a comparison threshold for each comparator 402. Therefor it should be understood that other circuit structures that provide this functionality (along with the voltage over-stress and ringing protections described below) may also be utilized for the comparators 402.

The load current sensor comprises a number of comparators 402 and biasing logic 404. Each comparator 402 comprises a transistor MP_REP of a similar device type as the load pass transistor MP (e.g., similar or proportional threshold and mobility characteristics). A gate of MP_REP is coupled to receive the voltage VMP applied at the gate of transistor MP. The effective size of MP_REP may be made adjustable via calibration. Because MP_REP mirrors the responses of MP to gate drive, the current Irep is directly proportional to the current $I_{load}$ in response to a given VMP applied to the gate of MP.

The drain node of MP_REP is connected to the output of a unit unity gain buffer/amplifier 502 formed by transistors M5-M9. Subsequent stages of the comparator include a Schmitt trigger 504 and an inverter 506. When VMP decreases due to an increase in load current, more current flows through MP_REP, charging its drain node at the input of the Schmitt trigger 504. In the absence of current from MP_REP, this node may be configured by the unity gain amplifier 502 to a potential of for example ¼ VDD. The unity gain amplifier 502 also acts as a low-impedance load on MP_REP, preventing substantial voltage fluctuations at the input to the Schmitt trigger 504 and protecting thin-gate devices utilized in MP_REP against voltage over-stress.

Utilizing the Schmitt trigger 504 configures the comparator with different rising and falling trip points for the input VMP, reducing the potential for ringing by the output OUT.

If the current supplied by MP_REP exceeds the bias current generated in the unit gain buffer by the applied BIAS voltage, the drain node of MP_REP charges up to VDD, driving the OUT signal of the comparator high and increasing the feed-forward supply noise cancellation gain in the regulator.

Each of the comparators 402 may be configured with a different threshold voltage (the level of $I_{load}$ at which the comparator toggles OUT) in a number of ways. For example, the threshold voltage may be configured differently in each of the comparators 402 by configuring each with a different sized MP_REP transistor. Alternatively, the threshold may be configured differently in each of the comparators 402 by varying the current flow in the unity gain amplifier 502 (e . . . , by varying the BIAS voltage/current or V_DIV voltage for the comparators 402, or both, from the biasing logic 404). The biasing voltage V_DIV, may be the same for all the comparators 402.

The size of the MP_REP transistor, and hence the trip/threshold voltage of a comparator, may be implemented with a number of parallel thin-gate device "fingers" (parallel current-carrying branches) in the device. For dynamically-tunable (field-tunable) operation, some subset of the total number of configured fingers may be enabled to or disabled from conducting current.

Although the depicted embodiment comprises five comparators 402, any number may be utilized, depending on the number of trip points called for by the particular application. Each comparator output (OUT1-OUT 5) may be applied to control one "finger", e.g., parallel branch, of a feed-forward supply noise cancellation circuit (see FIG. 6). As $I_{load}$ changes, more of the comparators 402 will trip, cutting off or turning on more or less bias current in the feed-forward supply noise cancellation circuit.

Figure 6:
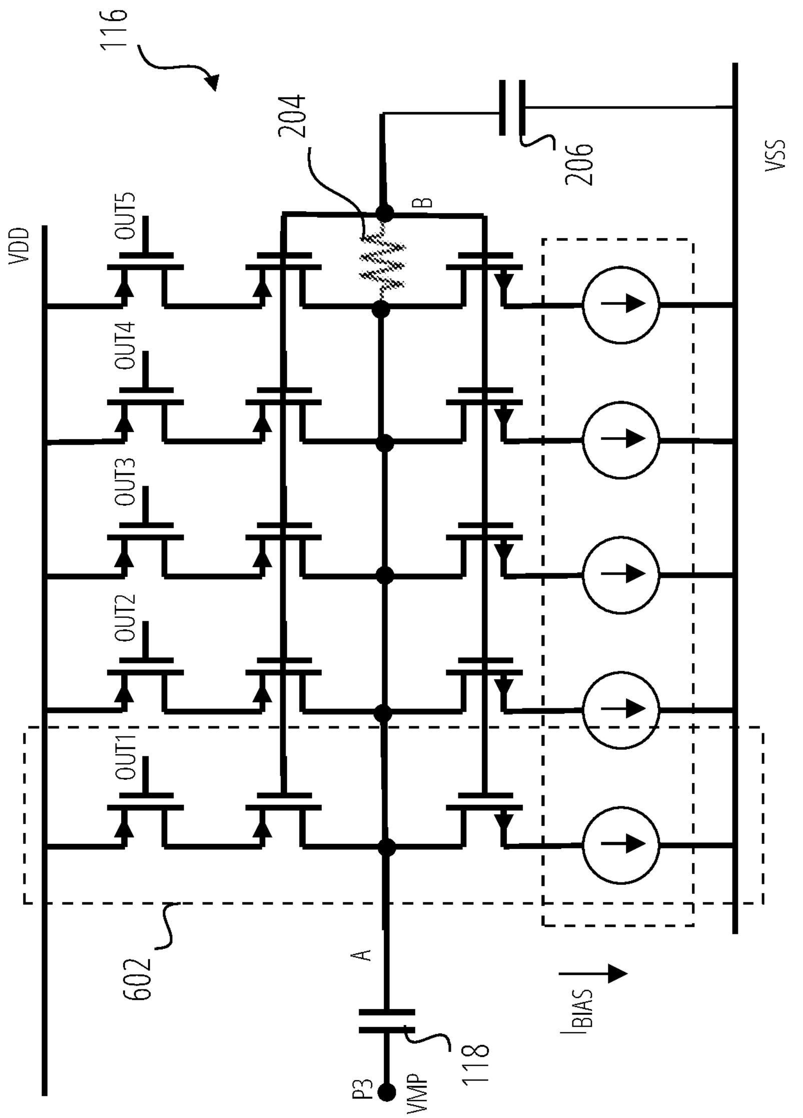
FIG. 6 depicts a feed-forward supply noise cancellation circuit in one embodiment.

FIG. 6 depicts a feed-forward supply noise cancellation circuit in one embodiment. The depicted embodiment comprises five gain adjustment stages 602, although other numbers of stages may be utilized depending on the gain adjustment resolution called for by the implementation. Each gain adjustment stage 602 is driven by an output of one of the comparators 402 of the load current sensor 114. The gain adjustment stages 602 collectively implement the adjustable current sources 202 that determine the bias current $I_{bias}$.

Supply noise in injected into the circuit from the supply rail (VDD). As the load current varies, different comparators 402 of the load current sensor 114 trip, adjusting the bias current $I_{bias}$ of the feed-forward supply noise cancellation to adjust toward a more optimal noise-cancellation gain setting for the immediate level of load current $I_{load}$.

The feed-forward supply noise cancellation circuit involves high pass filtering (resistive element 204 and capacitive element 206) of the supply noise while concurrently amplifying and injecting the noise into the gate of the pass transistor (MP) via a coupling capacitive element 118. Setting VDD as input and the voltage at node A ($V_A$) as output, the transfer function is:

$$\frac{V_A}{VDD} = \frac{1+SRC}{1+\frac{1}{1+g_m r}+\frac{SC}{g_m}} \qquad \text{Zero} = \frac{1}{RC} \qquad \text{Pole} \approx \frac{g_m}{C}$$

where r is the output impedance of the bias current source, R is the value of resistive element 204, $g_m$ is the transconductance of transistor MP, and C is the value of capacitive element 206. The gain is unity at 0 Hz and approaches $g_m R$ as the frequency increases. As long as $g_m > 1/R$ and $g_m/C$ is close to the unit gain bandwidth of the regulator, the high frequency noise on VDD is amplified and fed forward, effectively mitigating the power supply noise rejection hump depicted in FIG. 3.

The bias current $I_{bias}$ is operative in maintaining the high-frequency gain within a useful range and preventing overcompensation of the noise cancellation at different load voltage levels. The high frequency gain is directly proportional to the square root of the bias current and substantially insensitive to load voltage changes. At high frequencies the transfer function becomes:

$$\frac{V_A}{VDD} = \sqrt{2\mu_n c_{ox}\frac{W}{L}I_{bias}} \times R$$

where $2\mu_n c_{ox}$ embodies physical characteristics of the pass transistor MP relating to electron mobility, as known in the art.

The variation of the load current sensor 114 intrinsic characteristics across process and temperature variation facilitate the avoidance of under-compensation. For example, power supply noise rejection tends to perform more poorly at slower process corners. However, the comparators 402 inside the load current sensor 114 trip more readily the under lower load conditions that occur at slower process corners, boosting the feed-forward supply noise cancellation gain to cancel the noise more effectively. The bias current $I_{bias}$, transistor channel dimension ratio (W/L), and resistive element 204 value settings may be configured to meet the power supply noise rejection performance needed for a particular application.

LISTING OF DRAWING ELEMENTS

102 voltage follower
104 load
106 resistive element
108 capacitive element
110 fixed current source
112 amplifier
114 load current sensor
116 noise cancellation circuit
118 capacitive element
202 adjustable current source
204 resistive element
206 capacitive element
402 comparator
404 biasing logic
502 unity gain amplifier
504 Schmitt trigger
506 inverter
602 gain adjustment stage Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the intended invention as claimed. The scope of inventive subject matter is not limited to the depicted embodiments but is rather set forth in the following Claims.

What is claimed is:

1. A noise suppression circuit comprising:
a pass transistor for a load current; and
a feed-forward supply noise cancellation circuit configured to provide gain increments to generate a noise-cancelling signal at the gate of the pass transistor in response to changes in the load current.

2. The noise suppression circuit of claim 1, further comprising:
a load sensor configured to generate the gain increments at particular levels of the load current.

3. The noise suppression circuit of claim 2, wherein the load sensor comprises a plurality of comparators each configured to trip at a different level of the load current.

4. The noise suppression circuit of claim 3, each comparator comprising an amplifier; and
wherein a trip point of each particular comparator is determined by a bias current configured in the particular comparator.

5. The noise suppression circuit of claim 3, wherein each comparator is configured to convert a gate voltage of the pass transistor into a mirror current of the load current.

6. The noise suppression circuit of claim 5, wherein the mirror current is generated with a scale replica of the pass transistor.

7. The noise suppression circuit of claim 6, wherein a trip point of each particular comparator is determined by a size of the scale replica of the pass transistor utilized in the particular comparator.

8. The noise suppression circuit of claim 1, wherein the feed-forward supply noise cancellation circuit is configured to implement the gain increments as increments of a bias current of a low-pass filter.

9. A load voltage regulator comprising:
a pass transistor for a load current;
a gate voltage sensor coupled to a gate of the pass transistor; and
a feed-forward supply noise cancellation circuit configured to modify a gain of the feed-forward supply noise cancellation circuit at increments of the gate voltage.

10. The load voltage regulator of claim 9, further comprising:
the feed-forward supply noise cancellation circuit coupled to the gate of the pass transistor.

11. The load voltage regulator of claim 9, wherein the load sensor comprises a plurality of comparators each configured to trip at a different level of the gate voltage.

12. The load voltage regulator of claim 11, each comparator comprising:
a unity gain amplifier; and
wherein a trip point of each particular comparator is determined by a bias current of the unity gain amplifier.

13. The load voltage regulator of claim 11, wherein each comparator is configured to convert the gate voltage into a mirror current of the load current.

14. The load voltage regulator of claim 13, wherein the mirror current is generated with a scale replica of the pass transistor.

15. The load voltage regulator of claim 14, wherein a trip point of each particular comparator is determined by a size of the scale replica of the pass transistor utilized in the particular comparator.

16. The load voltage regulator of claim 9, wherein the feed-forward supply noise cancellation circuit is configured to adjust the gain of the feed-forward supply noise cancellation circuit in increments of a bias current of a low-pass filter.

17. A supply noise suppression process comprising:
monitoring a gate voltage at a pass transistor for a load;
adjusting a gain of a feed-forward supply noise cancellation circuit to modulate the gate voltage with a supply noise suppression signal in response to changes in the gate voltage; and
generating increments to the gain at particular levels of a load current through the pass transistor.

18. The supply noise suppression process of claim 17, further comprising:
operating a plurality of comparators each configured to trip at a different level of the load current to generate the increments to the gain.

19. The supply noise suppression process of claim 18, further comprising:
configuring each comparator to convert the gate voltage into a mirror current of the load current.

* * * * *